United States Patent
Fujii et al.

(10) Patent No.: US 11,385,564 B2
(45) Date of Patent: Jul. 12, 2022

(54) DEVELOPMENT ROLLER FOR ELECTROPHOTOGRAPHIC DEVICE

(71) Applicant: Sumitomo Riko Company Limited, Aichi (JP)

(72) Inventors: Kengo Fujii, Aichi (JP); Keiichi Ikegami, Aichi (JP); Takeru Horiuchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/475,323

(22) Filed: Sep. 14, 2021

(65) Prior Publication Data

US 2022/0004117 A1 Jan. 6, 2022

Related U.S. Application Data

(63) Continuation of application No. PCT/JP2020/016692, filed on Apr. 16, 2020.

(30) Foreign Application Priority Data

Apr. 25, 2019 (JP) .............................. JP2019-083491

(51) Int. Cl.
*G03G 15/08* (2006.01)
*G03G 15/02* (2006.01)

(52) U.S. Cl.
CPC ..... *G03G 15/0808* (2013.01); *G03G 15/0233* (2013.01)

(58) Field of Classification Search
None
See application file for complete search history.

(56) References Cited

U.S. PATENT DOCUMENTS

| 10,394,161 B2 * | 8/2019 | Kadoshima ............. C08L 33/14 |
| 2019/0163090 A1 | 5/2019 | Kadoshima et al. |
| 2021/0308719 A1 * | 10/2021 | Mutsuda .................. B05D 7/24 |

FOREIGN PATENT DOCUMENTS

| JP | 4215155 | 1/2009 |
| JP | 2018025609 | 2/2018 |

OTHER PUBLICATIONS

"International Search Report (Form PCT/ISA/210) of PCT/JP2020/016692," dated Jun. 30, 2020, with English translation thereof, pp. 1-6.

* cited by examiner

*Primary Examiner* — Sevan A Aydin
(74) *Attorney, Agent, or Firm* — JCIPRNET

(57) ABSTRACT

A development roller for an electrophotographic device that can both reduce resistance and suppress bleeding-out of an ion-conducting agent is provided. A development roller for an electrophotographic device 10 is provided with a shaft body 12, an elastic body layer 14 formed on the outer periphery of the shaft body 12, and a surface layer formed on the outer periphery of the elastic body layer 14. The surface layer 16 includes the following constituents (a) to (c), and the content of constituent (b) is 3.0 to 60 parts by mass, relative to 100 parts by mass of constituent (a). Constituent (a) is a binder comprising acrylonitrile-butadiene rubber, where the content of acrylonitrile is 31 mass % or more and 36 mass % or less. Constituent (b) is an ion-conducting agent. Constituent (c) is an acrylic polymer comprising at least one selected from among a silicone group and a fluorine group.

1 Claim, 1 Drawing Sheet

(a)
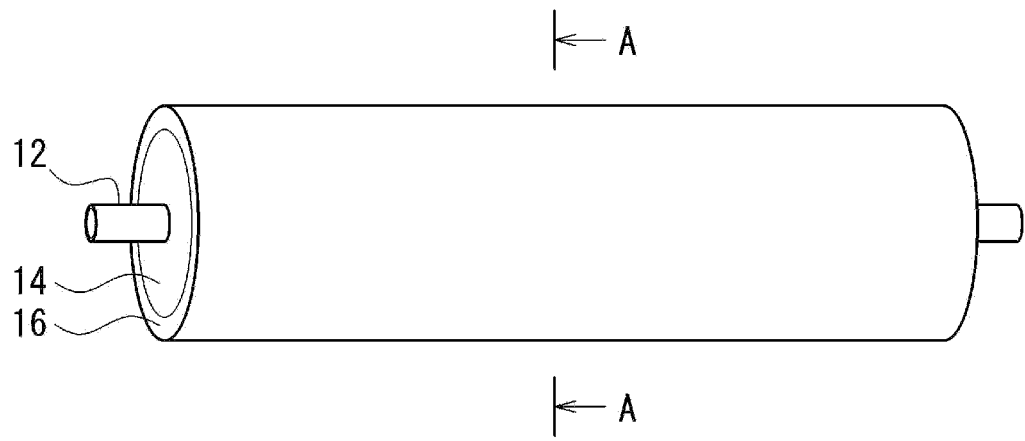
(b)
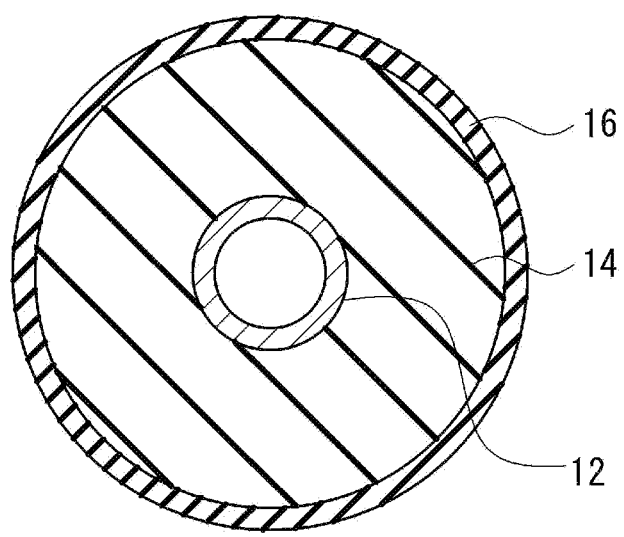

DEVELOPMENT ROLLER FOR ELECTROPHOTOGRAPHIC DEVICE

CROSS-REFERENCE TO RELATED APPLICATIONS

This application is a continuation application of International Application number PCT/JP2020/016692, filed on Apr. 16, 2020, which claims the priority benefit of Japan Patent Application No. 2019-083491 filed on Apr. 25, 2019. The entirety of each of the above-mentioned patent application is hereby incorporated by reference herein and made a part of this specification.

BACKGROUND

Technical Field

The present disclosure relates to a development roller for an electrophotographic device that is suitably used in an electrophotographic device such as a copier, a printer, and a facsimile which use an electrophotographic technique.

Related Art

In electrophotographic devices such as copiers, printers, and facsimiles which use an electrophotographic technique, conductive rollers such as a charging roller, a development roller, a transfer roller, and a toner supply roller are arranged around a photosensitive drum. As the development roller, a roller including a shaft body, an elastic body layer formed on the outer periphery of the shaft body, and a surface layer formed on the outer periphery of the elastic body layer is known.

For example, development rollers are becoming more durable and faster. In the development rollers, it is required to stabilize toner electric chargeability and toner transportability in order to minimize image degradation due to surface defects and surface degradation of rollers due to durability. If the amount of charge of the toner is large, the development roller retains more of the toner than necessary, which makes toner transportability unstable and leads to degradation of image quality. In order to stabilize toner electric chargeability, it is necessary to lower the resistance of the development roller. For example, there is a method of adding an ion-conducting agent to a surface layer and minimizing an increase in toner charge.

CITATION LIST

Patent Literature

[Patent Literature 1]
Japanese Patent No. 4215155
[Patent Literature 2]
Japanese Patent Laid-Open No. 2018-025609

The amount of the ion-conducting agent that can be added to the surface layer of the development roller is limited by the risk of occurrence of bleed-out of the ion-conducting agent, and development rollers are still not able to achieve sufficiently low resistance.

An objective to be achieved by the present disclosure is to provide a development roller for an electrophotographic device that can achieve both low resistance and minimizing of bleed-out of an ion-conducting agent.

SUMMARY

A development roller for an electrophotographic device according to the present disclosure includes a shaft body, an elastic body layer formed on the outer periphery of the shaft body, and a surface layer formed on the outer periphery of the elastic body layer, wherein the surface layer contains the following (a) to (c), and the content of (b) is 3.0 parts by mass or more and 60 parts by mass or less with respect to 100 parts by mass of (a).

(a) a binder made of an acrylonitrile-butadiene rubber having an acrylonitrile amount of 31 mass % or more and 36 mass % or less (b) an ion-conducting agent (c) an acrylic polymer having at least one selected from among a silicone group and a fluorine-containing group The content of (b) is preferably 3.0 parts by mass or more and 40 parts by mass or less with respect to 100 parts by mass of (a). The acrylonitrile amount of (a) is preferably 32 mass % or more and 35 mass % or less. (c) is preferably an acrylic block copolymer composed of a polymer segment having at least one selected from among a silicone group and a fluorine-containing group and a polymer segment having no silicone group or fluorine-containing group. (c) is preferably an acrylic polymer having both a silicone group and a fluorine-containing group. (a) is preferably a crosslinked body. Thus, the development roller for an electrophotographic device according to the present disclosure is suitably used as a development roller for an electrophotographic device.

BRIEF DESCRIPTION OF DRAWINGS (a) of FIG. 1 is a schematic view of an appearance of a development roller for an electrophotographic device according to one embodiment of the present disclosure and (b) of FIG. 1 is a cross-sectional view taken along the line A-A.

DESCRIPTION OF THE EMBODIMENTS

According to the development roller for an electrophotographic device according to the present disclosure, since the surface layer contains the above (a) to (c) at specific proportions, it is possible to achieve both low resistance and minimizing of bleed-out of the ion-conducting agent.

A development roller for an electrophotographic device according to the present disclosure (hereinafter may be simply referred to as a development roller) will be described in detail. (a) of FIG. 1 is a schematic view of an appearance of a development roller for an electrophotographic device according to one embodiment of the present disclosure and (b) of FIG. 1 is a cross-sectional view taken along the line A-A.

A development roller 10 includes a shaft body 12, an elastic body layer 14 formed on the outer periphery of the shaft body 12, and a surface layer 16 formed on the outer periphery of the elastic body layer 14. The elastic body layer 14 is a layer (base layer) serving as a base of the development roller 10. The surface layer 16 is a layer that appears on the surface of the development roller 10. In addition, although not particularly shown, as necessary, an intermediate layer such as a resistance adjustment layer may be formed between the elastic body layer 14 and the surface layer 16.

The surface layer 16 contains the following (a) to (c). The content of (b) is 3.0 parts by mass or more and 60 parts by mass or less with respect to 100 parts by mass of (a).

(a) A binder made of an acrylonitrile-butadiene rubber having an acrylonitrile amount of 31 mass % or more and 36 mass % or less (b) An ion-conducting agent (c) An acrylic polymer having at least one selected from among a silicone group and a fluorine-containing group (a) is a binder made of acrylonitrile-butadiene rubber (NBR) and has an acrylonitrile amount of 31 mass % or more and 36 mass % or less. In (a), since the acrylonitrile amount is relatively large, the interaction of attracting cations of the ion-conducting agent (b) is strong and bleed-out of the ion-conducting agent (b) from the surface layer 16 is minimized. When the acrylonitrile amount of (a) is less than 31 mass %, an effect of minimizing bleed-out of the ion-conducting agent (b) from the surface layer 16 is not sufficient. On the other hand, when the acrylonitrile amount of (a) exceeds 36 mass %, the acrylonitrile amount becomes too large, the interaction between nitrile groups becomes strong, the interaction of attracting cations of the ion-conducting agent (b) becomes weak, and the effect of minimizing bleed-out of the ion-conducting agent (b) from the surface layer 16 is not sufficient. The acrylonitrile amount of (a) is more preferably 32 mass % or more and 35 mass % or less in order to improve the effect of minimizing bleed-out of the ion-conducting agent (b) from the surface layer 16.

(a) is preferably a crosslinked body. The crosslinking agent for forming (a) as a crosslinked body is not particularly limited, and any crosslinking agent for diene rubber can be applied. Examples of such crosslinking agents include a sulfur crosslinking agent, a peroxide crosslinking agent, and a resin crosslinking agent. These crosslinking agents may be used alone or two or more thereof may be used in combination.

Examples of sulfur crosslinking agents include conventionally known sulfur crosslinking agents such as powdered sulfur, precipitated sulfur, colloidal sulfur, surface-treated sulfur, insoluble sulfur, sulfur chloride, thiuram-based vulcanization accelerator, and polymeric polysulfide.

Examples of peroxide crosslinking agents include conventionally known peroxide crosslinking agents such as a peroxyketal, dialkyl peroxide, peroxyester, ketone peroxide, peroxydicarbonate, diacyl peroxide, and hydroperoxide.

Examples of resin crosslinking agents include conventionally known resin crosslinking agents such as a phenolic resin, a urea resin, an amino resin, a guanaquinine resin, a xylene resin, an unsaturated polyester resin, a diallyl phthalate resin, an epoxy resin, and a urethane resin.

The formulation amount of the crosslinking agent is preferably in a range of 0.1 to 70 parts by mass, more preferably in a range of 0.3 to 60 parts by mass, and still more preferably in a range of 0.5 to 50 parts by mass with respect to 100 parts by mass of the uncrosslinked rubber in order to prevent bleeding.

(b) is an ion-conducting agent. When the surface layer 16 contains (b), it can have a low resistance. In order to achieve a sufficiently low resistance, the content of (b) is 3.0 parts by mass or more with respect to 100 parts by mass of (a). In addition, in order to achieve a sufficiently low resistance, the content of (b) may be 5.0 parts by mass or more, 10 parts by mass or more, 15 parts by mass or more, or 20 parts by mass or more with respect to 100 parts by mass of (a). When the content of (b) is larger, the surface layer 16 can have a lower resistance. In the present disclosure, even if the content of (b) is increased by that much, bleed-out of (b) can be minimized. On the other hand, the content of (b) is 60 parts by mass or less with respect to 100 parts by mass of (a). When the content of (b) exceeds 60 parts by mass, bleed-out of (b) cannot be minimized even by adjusting (a) and (c). The content of (b) may be 55 parts by mass or less, 50 parts by mass or less, 45 parts by mass or less, or 40 parts by mass or less with respect to 100 parts by mass of (a).

Examples of ion-conducting agents include a quaternary ammonium salt, a quaternary phosphonium salt, a pyridinium salt, and a borate. The ion-conducting agent may be a solid ion-conducting agent that is a solid at room temperature or a liquid ion-conducting agent that is a liquid at room temperature. Among these, a liquid ion-conducting agent that is a liquid at room temperature is more preferable in consideration of better dispersibility.

Examples of quaternary ammonium salts and quaternary phosphonium salts include those having one or two or more alkyl groups or aryl groups having about 1 to 18 carbon atoms (a methyl group, an ethyl group, a propyl group, a butyl group, a hexyl group, an octyl group, a decyl group, a phenyl group, a xylyl group, etc.) and containing anions such as halogen ions, $ClO_4^-$, $BF_4^-$, $SO_4^{2-}$, $HSO_4^-$, $C_2H_5SO_4^-$, $CF_3CO^-$, $CF_3SO_3^-$, $(CF_3SO_2)_2N^-$, $PF_6^-$, $(CF_3CF_2SO_2)_2N^-$, $CF_3(CF_2)_3SO_3^-$, $(CF_3SO_2)_3C^-$, and $CF_3(CF_2)_2COO^-$.

Regarding anions of quaternary ammonium salts and quaternary phosphonium salts, a fluorine-containing anion is preferable because it has excellent toner electric chargeability under a high temperature and high humidity environment (under an HH environment). Regarding the anion, $CF_3COO^-$, $CF_3SO_3^-$, $(CF_3SO_2)_2N^-$, $PF_6^-$, $(CF_3CF_2SO_2)_2N^-$, $CF_3(CF_2)_3SO_3^-$, $(CF_3SO_2)_3C^-$, or $CF_3(CF_2)_2COO^-$ is particularly preferable.

The pyridinium salt may be an unsubstituted pyridinium salt having no substituents on any carbon atoms of an aromatic ring and having no N-substituent, a pyridinium salt having one or two or more alkyl groups or aryl groups having about 1 to 18 carbon atoms (a methyl group, an ethyl group, a propyl group, a butyl group, a hexyl group, an octyl group, a decyl group, a phenyl group, a xylyl group, etc.) at an arbitrary carbon atoms of an aromatic ring and having no N-substituent and having a substituent, or a substituent-containing pyridinium salt having no substituents on any carbon atoms of an aromatic ring and having an alkyl group or aryl group having about 1 to 18 carbon atoms at the N position. Examples of anions of pyridinium salts include those exemplified as anions of quaternary ammonium salts and quaternary phosphonium salts.

Examples of borates include those having one or two or more alkyl groups or aryl groups having about 1 to 18 carbon atoms (a methyl group, an ethyl group, a propyl group, a butyl group, a hexyl group, an octyl group, a decyl group, a phenyl group, a xylyl group, etc.) and containing alkali metal ions or alkaline earth metal ions such as lithium ions, sodium ions, potassium ions, and calcium ions.

(c) is an acrylic polymer having at least one selected from among a silicone group and a fluorine-containing group. Since (c) is an acrylic polymer, it has a hydrocarbon chain moiety derived from a (meth)acryloyl group. The acrylic polymer represents, for example, a (meth)acrylate polymer, a (meth)acrylamide polymer, or a copolymer of (meth) acrylate and (meth)acrylamide. A (meth)acrylate generally refers to an acrylate and a methacrylate. In addition, a (meth)acrylamide generally refers to an acrylamide and a mehtacrylamide. In addition, a (meth)acryloyl group generally refers to an acryloyl group and a methacryloyl group.

When a hydrocarbon chain moiety derived from a (meth) acryloyl group is compatible (attracted by interaction) with a hydrocarbon chain derived from a butadiene moiety of (a), since (c) is fixed to the surface layer 16, bleed-out of (c) is minimized. Then, at least one selected from among a silicone group and a fluorine-containing group of (c) is oriented on the top surface of the surface layer 16 because it is not compatible with the hydrocarbon chain derived from the butadiene moiety of (a). Since the silicone group and the fluorine-containing group oriented on the top surface of the surface layer 16 have low affinity with the ion-conducting agent (b) with high polarity, the ion-conducting agent is less likely to move to the top surface of the surface layer 16, and an effect of blocking bleed-out of the ion-conducting agent can be exhibited. In addition, in (c), the silicone group and the fluorine-containing group oriented on the top surface of the surface layer 16 can impart functions such as slipperiness and chargeability to the surface of the surface layer 16. (c) may have a cation group or may not have a cation group.

(c) is preferably an acrylic block copolymer composed of a polymer segment having at least one selected from among a silicone group and a fluorine-containing group and a polymer segment having no silicone group or fluorine-containing group because the compatibility effect between the surface orientation of a silicone group or a fluorine-containing group and (a) in the hydrocarbon chain moiety derived from a (meth)acryloyl group is excellent. The polymer segment having at least one selected from among a silicone group and a fluorine-containing group can be formed from, for example, a compound having at least one selected from among a silicone group and a fluorine-containing group and other polymers. The polymer segment having no silicone group or fluorine-containing group can be formed from other polymers.

Examples of (c) include (c1) an acrylic polymer having a silicone group, (c2) an acrylic polymer having a fluorine-containing group, and (c3) an acrylic polymer having a silicone group and a fluorine-containing group. Regarding (c), these may be used alone or two or more thereof may be used in combination.

(c1) can be obtained by polymerizing a (meth)acrylate having a silicone group and/or a (meth)acrylamide having a silicone group. (c1) may be a copolymer that contains one or two or more non-modified (meth)acrylates or non-modified (meth)acrylamides having no silicone group or fluorine group as copolymerization components in addition to the above components. When a non-modified (meth)acrylate or non-modified (meth)acrylamide is included as a copolymerization component, this is advantageous in terms of compatibility with (a).

The (meth)acrylate having a silicone group and the (meth) acrylamide having a silicone group are organopolysiloxanes having one or two or more (meth)acryloyl groups. The organopolysiloxanes have an organic group in addition to a (meth)acryloyl group. The organic group is a monovalent substituted or unsubstituted hydrocarbon group. Examples of unsubstituted hydrocarbon groups include alkyl groups such as a methyl group, an ethyl group, a propyl group, a butyl group, a hexyl group, and a dodecyl group, aryl groups such as a phenyl group, and aralkyl groups such as a β-phenylethyl group and a β-phenylpropyl group. Examples of substituted hydrocarbon groups include a chloromethyl group and a 3,3,3-trifluoropropyl group. Regarding the organopolysiloxane, those having a methyl group as an organic group are generally frequently used because they are easily synthesized. The organopolysiloxane is preferably linear but may be branched or cyclic. The molecular weight of the organopolysiloxane is not particularly limited, and those having a number average molecular weight in a range of 200 to 30,000 can be suitably used.

In (c1), examples of copolymerizable non-modified (meth)acrylates include alkyl (meth)acrylates and hydroxyalkyl (meth)acrylates. Examples of alkyl (meth)acrylates include methyl (meth)acrylate, ethyl (meth)acrylate, propyl (meth)acrylate, butyl (meth)acrylate, and 2-ethylhexyl (meth)acrylate. Examples of hydroxyalkyl (meth)acrylates include hydroxyethyl (meth)acrylate, hydroxypropyl (meth) acrylate, and hydroxybutyl (meth)acrylate. Among these, methyl (meth)acrylate is preferable in consideration of copolymerization reactivity and the like.

In (c1), examples of copolymerizable non-modified (meth)acrylamides include (meth)acrylamide, alkyl (meth) acrylamide, and hydroxyalkyl (meth)acrylamide. Examples of alkyl (meth)acrylamides include methyl (meth)acrylamide, ethyl (meth)acrylamide, propyl (meth)acrylamide, butyl (meth)acrylamide, and 2-ethylhexyl (meth)acrylamide. Examples of hydroxyalkyl (meth)acrylamides include hydroxyethyl (meth)acrylamide, hydroxypropyl (meth)acrylamide, and hydroxybutyl (meth)acrylamide. Among these, methyl (meth)acrylamide is preferable in consideration of copolymerization reactivity.

(c2) can be obtained by polymerizing a (meth)acrylate having a fluorine-containing group and/or a (meth)acrylamide having a fluorine-containing group. (c2) may be a copolymer that contains one or two or more non-modified (meth)acrylates or non-modified (meth)acrylamides having no silicone group or fluorine group as copolymerization components in addition to the above components.

In the (meth)acrylate having a fluorine-containing group and the (meth)acrylamide having a fluorine-containing group, examples of fluorine-containing groups include a fluoroalkyl group having 1 to 20 carbon atoms. The fluoroalkyl group may be a perfluoroalkyl group in which all hydrogen atoms of an alkyl group are substituted with fluorine atoms or a fluoroalkyl group in which some hydrogen atoms of an alkyl group are substituted with fluorine atoms. Among these, a perfluoroalkyl group is preferable because it is easily unevenly distributed on the surface of the surface layer 16.

Examples of fluoroalkyl groups having 1 to 20 carbon atoms include a trifluoromethyl group, a pentafluoroethyl group, a heptafluoropropyl group, a nonafluorobutyl group, a trifluoroethyl group, a pentafluoropropyl group, and a heptafluoro butyl group.

The (meth)acrylate having a fluorine-containing group and the (meth)acrylamide having a fluorine-containing group can be represented by, for example, the following General Formula (1).

[Chem. 1]

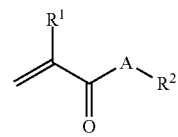

(1)

In Formula (1), A is O or NH, $R^1$ is a hydrogen atom or a methyl group, and $R^2$ is a fluoroalkyl group having 1 to 20 carbon atoms.

(c3) can be obtained by copolymerizing a (meth)acrylate having a silicone group and/or a (meth)acrylamide having a silicone group, and a (meth)acrylate having a fluorine-containing group and/or a (meth)acrylamide having a fluorine-containing group. (c3) may be a copolymer that further contains one or two or more non-modified (meth)acrylates or non-modified (meth)acrylamides having no silicone group or fluorine group as copolymerization components in addition to the above components.

Examples of (meth)acrylates having a silicone group and (meth)acrylamides having a silicone group include those exemplified in (c1). Examples of (meth)acrylates having a fluorine-containing group and (meth)acrylamides having a fluorine-containing group include those exemplified in (c2).

In (c), the content of the silicone group is preferably in a range of 0.01 to 60 mol % because (c) is easily unevenly distributed on the surface of the surface layer 16. The content is more preferably 0.05 to 50 mol %, and still more preferably 0.1 to 30 mol %. In addition, the content of the fluorine-containing group is preferably in a range of 0.01 to 60 mol % because (c) is easily unevenly distributed on the surface of the surface layer 16. The content is more preferably 0.05 to 50 mol %, and still more preferably 0.1 to 30 mol %. Each content can be measured through GC-MS analysis, NMR analysis, or the like.

Within (c), the content of the acrylic polymer having a silicone group with respect to 100 parts by mass of (a) is preferably 0.1 parts by mass or more because the effect of minimizing bleed-out of (b) is excellent. The content is more preferably 0.5 parts by mass or more, and still more preferably 1.0 part by mass or more. On the other hand, the content is preferably 40 parts by mass or less with respect to 100 parts by mass of the binder (a) because the electric charge regulation becomes better. The content is more preferably 30 parts by mass or less, and still more preferably 20 parts by mass or less.

In addition, within (c), the content of the acrylic polymer having a fluorine-containing group is preferably 0.1 parts by mass or more with respect to 100 parts by mass of (a) because the effect of minimizing bleed-out of (b) is excellent. The content is more preferably 0.5 parts by mass or more and still more preferably 1.0 part by mass or more. On the other hand, the content is preferably 40 parts by mass or less with respect to 100 parts by mass of the binder (a) because the electric charge regulation becomes better. The content is more preferably 30 parts by mass or less, and still more preferably 20 parts by mass or less.

The surface layer 16 may contain an electron-conducting agent in a range that does not influence the present disclosure, or may not contain it. In addition, it may or may not contain other polymer components. In addition, it may or may not contain particles for forming roughness to form surface roughness. In addition, it may contain an additive. Examples of electron-conducting agents include conductive oxides such as carbon black, graphite, conductive titanium oxide, conductive zinc oxide, and conductive tin oxide. The content of the electron-conducting agent with respect to 100 parts by mass of (a) is preferably in a range of 0.1 to 5.0 parts by mass, and more preferably in a range of 0.5 to 3.0 parts by mass. Examples of additives include a filler, a stabilizer, a UV absorber, a lubricant, a mold release agent, a dye, a pigment, and a flame retardant.

The surface layer 16 can be formed by applying a material for forming the surface layer 16 to the outer peripheral surface of the elastic body layer 14 and performing a heat treatment, a crosslinking treatment, or the like as necessary. The material for forming the surface layer 16 may contain a diluting solvent. Examples of diluting solvents include ketone solvents such as methyl ethyl ketone (MEK) and methyl isobutyl ketone, alcohol solvents such as isopropyl alcohol (IPA), methanol, and ethanol, hydrocarbon solvents such as hexane and toluene, acetate solvents such as ethyl acetate and butyl acetate, ether solvents such as diethyl ether and tetrahydrofuran, and water.

The thickness of the surface layer 16 is not particularly limited, but is preferably in a range of 0.1 to 50 μm, more preferably in a range of 0.1 to 30 μm, and still more preferably in a range of 0.3 to 20 μm. The thickness of the surface layer 16 can be measured by observing the cross section using a laser microscope (for example, "VK-9510" commercially available from Keyence Corporation). For example, the thickness can be represented by an average of distances from the surface of the elastic body layer 14 to the surface of the surface layer 16 measured at five arbitrary positions.

The surface layer 16 can be adjusted to have a predetermined volume resistivity depending on the type of the binder, the type of the ion-conducting agent, the formulation amount, and the like. The volume resistivity of the surface layer 16 may be appropriately set in a range of $10^7$ to $10^{14}\Omega\cdot\text{cm}$, $10^8$ to $10^{13}\Omega\cdot\text{cm}$, or $10^9$ to $10^{12}\Omega\cdot\text{cm}$. The volume resistivity can be measured according to JIS K6911.

The elastic body layer 14 contains a crosslinked rubber. The elastic body layer 14 is formed of a conductive rubber composition containing an uncrosslinked rubber. The crosslinked rubber is obtained by crosslinking uncrosslinked rubber. The uncrosslinked rubber may be a polar rubber or a non-polar rubber.

The polar rubber is a rubber having a polar group, and examples of polar groups include a chloro group, a nitrile group, a carboxyl group, and an epoxy group. Specific examples of polar rubbers include hydrin rubber, nitrile rubber (NBR), urethane rubber (U), acrylic rubber (a copolymer of acrylic ester and 2-chloroethyl vinyl ether, ACM), chloroprene rubber (CR), and epoxidized natural rubber (ENR). Among polar rubbers, hydrin rubber or nitrile rubber (NBR) is more preferable because the volume resistivity is particularly easily reduced.

Examples of hydrin rubbers include an epichlorohydrin homopolymer (CO), an epichlorohydrin-ethylene oxide binary copolymer (ECO), an epichlorohydrin-allyl glycidyl ether binary copolymer (GCO), and an epichlorohydrin-ethylene oxide-allyl glycidyl ether terpolymer (GECO).

Examples of urethane rubbers include a polyether type urethane rubber having an ether bond in the molecule. The polyether type urethane rubber can be produced by a reaction between a polyether having a hydroxyl group at both ends and a diisocyanate. The polyether is not particularly limited, and examples thereof include polyethylene glycol and polypropylene glycol. The diisocyanate is not particularly limited, and examples thereof include tolylene diisocyanate and diphenylmethane diisocyanate.

Examples of non-polar rubbers include silicone rubber (Q), isoprene rubber (IR), natural rubber (NR), styrene butadiene rubber (SBR), and butadiene rubber (BR). Among non-polar rubbers, a silicone rubber is more preferable because it has low hardness and is less likely to be fatigued (has excellent elastic recovery).

Examples of crosslinking agents include a resin crosslinking agent, a sulfur crosslinking agent, a peroxide crosslinking agent, and a dechlorination crosslinking agent. These crosslinking agents may be used alone or two or more thereof may be used in combination.

Examples of resin crosslinking agents include conventionally known resin crosslinking agents such as a phenolic resin, a urea resin, an amino resin, a guanaquinine resin, a xylene resin, an unsaturated polyester resin, a diallyl phthalate resin, an epoxy resin, and a urethane resin.

Examples of sulfur crosslinking agents include conventionally known sulfur crosslinking agents such as powdered sulfur, precipitated sulfur, colloidal sulfur, surface-treated sulfur, insoluble sulfur, sulfur chloride, a thiuram-based vulcanization accelerator, and a polymer polysulfide.

Examples of peroxide crosslinking agents include conventionally known peroxide crosslinking agents such as a peroxyketal, dialkyl peroxide, peroxyester, ketone peroxide, peroxydicarbonate, diacyl peroxide, and hydroperoxide.

Examples of dechlorination crosslinking agents include a dithiocarbonate compound. More specifically, quinoxaline-2,3-dithiocarbonate, 6-methylquinoxaline-2,3-dithiocarbonate, 6-isopropylquinoxaline-2,3-dithiocarbonate, 5, 8-dimethylquinoxaline-2,3-dithiocarbonate, and the like may be exemplified.

The formulation amount of the crosslinking agent is preferably in a range of 0.1 to 2 parts by mass, more preferably in a range of 0.3 to 1.8 parts by mass, and still more preferably in a range of 0.5 to 1.5 parts by mass with respect to 100 parts by mass of the uncrosslinked rubber in order to prevent bleeding.

When a dechlorination crosslinking agent is used as the crosslinking agent, a dechlorination crosslinking accelerator may be used in combination. Examples of dechlorination crosslinking accelerators include 1,8-diazabicyclo(5,4,0)undecene-7 (hereinafter abbreviated as a DBU) and its weak acid salts. The dechlorination crosslinking accelerator may be used in the form of DBU but is preferably used in the form of its weak acid salts in consideration of handling. Examples of weak acid salts for DBU include its carbonate, stearate, 2-ethylhexylate, benzoate, salicylate, 3-hydroxy-2-naphthoate, phenolic resin salt, 2-mercaptobenzothiazole salt, and 2-mercaptobenzimidazole salt.

The content of the dechlorination crosslinking accelerator is preferably in a range of 0.1 to 2 parts by mass, more preferably in a range of 0.3 to 1.8 parts by mass, and still more preferably in a range of 0.5 to 1.5 parts by mass with respect to 100 parts by mass of the uncrosslinked rubber in order to prevent bleeding.

In order to impart conductivity, conventionally known conductive agents such as carbon black, graphite, c-$TiO_2$, c-ZnO, c-$SnO_2$ (c—means conductivity), and an ion-conducting agent (a quaternary ammonium salt, a borate and the like) can be appropriately added to the elastic body layer 14. In addition, various additives may be appropriately added as necessary. Examples of additives include a lubricant, a vulcanization accelerator, an antioxidant, optical stabilizer, a viscosity adjusting agent, a processing aid, a flame retardant, a plasticizer, a foaming agent, a filler, a dispersant, an anti-foaming agent, a pigment, and a mold release agent.

The elastic body layer 14 can be adjusted to have a predetermined volume resistivity depending on the type of the crosslinked rubber, the formulation amount of the ion-conducting agent, and formulation with an electron-conducting agent. The volume resistivity of the elastic body layer 14 may be appropriately set in a range of $10^2$ to $10^{10}$ Ω·cm, $10^3$ to $10^9$ Ω·cm, or $10^4$ to $10^8$ Ω·cm depending on applications and the like.

The thickness of the elastic body layer 14 is not particularly limited but may be appropriately set in a range of 0.1 to 10 mm depending on applications and the like.

The elastic body layer 14 can be produced, for example, as follows. First, the shaft body 12 is coaxially disposed in a hollow part of a roller forming mold, an uncrosslinked conductive rubber composition is injected, heated and cured (crosslinked), and demolding is then performed, or an uncrosslinked conductive rubber composition is extruded and molded on the surface of the shaft body 12, and thus the elastic body layer 14 is formed on the outer periphery of the shaft body 12.

The shaft body 12 is not particularly limited as long as it has conductivity. Specific examples thereof include a solid body made of a metal such as iron, stainless steel, and aluminum and a metal core formed of a hollow body. An adhesive, a primer, and the like may be applied to the surface of the shaft body 12 as necessary. That is, the elastic body layer 14 may be adhered to the shaft body 12 with an adhesive layer (primer layer) therebetween. As necessary, the adhesive, the primer, and the like may be made conductive.

According to the development roller 10 having the above configuration, the surface layer 16 contains (a) a binder made of an acrylonitrile-butadiene rubber having an acrylonitrile amount of 31 mass % or more and 36 mass % or less, (b) an ion-conducting agent, and (c) an acrylic polymer having at least one selected from among a silicone group and a fluorine-containing group, and the content of (b) with respect to 100 parts by mass of (a) is 3.0 parts by mass or more and 60 parts by mass or less, and thus it is possible to achieve both low resistance and minimizing of bleed-out of the ion-conducting agent. Thereby, the toner electric chargeability and toner transportability are stabilized so that degradation of image quality is minimized. This is thought to be caused by the fact that, since (a) is NBR having a relatively large amount of acrylonitrile, the interaction of attracting cations of the ion-conducting agent (b) is strong, and the ion-conducting agent (b) is unlikely to move to the surface of the surface layer 16, and since at least one selected from among a silicone group and a fluorine-containing group of (c) is oriented on the top surface of the surface layer 16, an effect of blocking bleed-out of the ion-conducting agent is exhibited, and thus even if the content of the ion-conducting agent (b) is large, bleed-out of the ion-conducting agent (b) from the surface layer 16 is minimized.

The development roller 10 is suitable as a development roller such as a charging roller, a development roller, a transfer roller, and a toner supply roller in electrophotographic devices such as copiers, printers, and facsimiles which use an electrophotographic technique, and particularly suitable as a development roller.

EXAMPLES

Hereinafter, the present disclosure will be described in detail with reference to examples and comparative examples.

Examples 1 to 13 and Comparative Examples 1 to 5

<Preparation of Composition for Elastic Body Layer>

A conductive silicone rubber (commercially available from Shin-Etsu Chemical Co., Ltd., "X-34-264A/B, mixing mass ratio A/B=1/1") was mixed using a static mixer to prepare a composition for an elastic body layer.

<Preparation of Elastic Body Layer>

A solid cylindrical iron bar with a diameter of 6 mm was prepared as a shaft body, and an adhesive was applied to the outer peripheral surface. The shaft body was set in a hollow space of a roller forming mold, the prepared composition for an elastic body layer was then injected into the hollow space, and heated and cured at 190° C. for 30 minutes, and demolding was performed. Thereby, a roller-like elastic body layer (with a thickness of 3 mm) made of a conductive silicone rubber was formed along the outer peripheral surface of the shaft body.

<Preparation of Surface Layer>

According to formulation proportions (parts by mass) shown in Table 1, a binder (NBR), a crosslinking agent, an ion-conducting agent, and an acrylic polymer were blended and the concentration was adjusted using a diluting solvent (MIBK) so that the concentration of the solid content was 14 mass %, and thereby a composition for a surface layer was prepared. Then, the composition for a surface layer was roller-coated on the outer peripheral surface of the elastic body layer and heated, and thereby a surface layer (with a thickness of 10 μm) was formed on the outer periphery of the elastic body layer. Thereby, a development roller was prepared.

Materials used as a surface layer material were as follows.

(a) Component
NBR<1>:"Nipol DN3335" commercially available from Zeon Corporation, an acrylonitrile content of 33.0 mass %
NBR<2>:"Nipol DN202" commercially available from Zeon Corporation, an acrylonitrile content of 31.0 mass %
NBR<3>: "JSR N230S" commercially available from JSR, an acrylonitrile content of 35.0 mass %
(Other NBR)
NBR<4>: "JSR N241" commercially available from JSR, an acrylonitrile content of 29.0 mass %
NBR<5>:"Nipol DN4050" commercially available from Zeon Corporation, an acrylonitrile content of 40.0 mass %
(Crosslinking Agent)
Phenolic resin: "5592" commercially available from DIC (b) Component
Ion-conducting agent <1>: "butyltrimethylammonium bis(trifluoromethylsulfonyl)imide" commercially available from FUJIFILM Wako Pure Chemical Corporation
Ion-conducting agent<2>: "tetrabutylphosphonium bis(trifluoromethanesulfonyl)imide" commercially available from FUJIFILM Wako Pure Chemical Corporation
Ion-conducting agent<3>:"1-hexyl-4-methylpyridinium bis(trifluoromethanesulfonyl)imide" commercially available from FUJIFILM Wako Pure Chemical Corporation (c) Component
Acrylic polymer<1>: acrylic polymer having a silicone group and a fluorine-containing group (the following synthetic product)
Acrylic polymer<2>: acrylic polymer having a fluorine-containing group ""Modiper F206" commercially available from NOF Corporation"
Acrylic polymer<3>: acrylic polymer having a silicone group ""Modiper FS710-1" commercially available from NOF Corporation"

(Synthesis of Acrylic Polymer <1>)

1.66 g (0.36 mmol) of acrylate-modified silicone oil ("X-22-174DX" commercially available from Shin-Etsu Chemical Co., Ltd.), 5.61 g (13 mmol) of 2-(perfluorohexyl) ethyl acrylate ("R-1620" commercially available from Daikin Industries, Ltd.), 8.67 g (86.64 mmol) of methyl methacrylate (commercially available from Junsei Chemical Co., Ltd.), 1.24 g (4 mmol) of dimethyl 1,1'-azobis(1-cyclohexanecarboxylate) ("VE-73" commercially available from Wako Pure Chemical Industries, Ltd.), and 14.06 g of methyl ethyl ketone (MEK) were put into a 100 mL reaction flask, bubbling with nitrogen was caused for 5 minutes with stirring, and polymerization was then caused at an internal solution temperature of 80° C. for 7 hours. Then, 26.04 g of MEK was put thereinto obtain a solution containing acrylic polymer having a silicone group and a fluorine-containing group in a solid content of 30%.

A sheet sample (with a thickness of 2 mm) was prepared from the prepared composition for a surface layer, and the bleeding resistance was evaluated. In addition, the image quality was evaluated using the prepared development roller as a development roller. The formulation composition (parts by mass) of the surface layer materials and the evaluation results are shown in the following table.

(Bleeding Resistance)

A development roller was incorporated into a commercially available toner cartridge ("TN-493C" commercially available from Brother Industries, Ltd.), and left under an environment of 50° C.×95% RH for 7 days. Then, each development roller was removed from the cartridge, and cured for 6 hours or longer and then incorporated into a commercially available color laser printer ("HL-L9319CDW" commercially available from Brother Industries, Ltd.), and a solid black image was printed (10 sheets) with the printer. Here, "⊚" indicates that no streaks occurred from the first sheet at the part corresponding to the contact part with a layer forming blade and a toner supply roller in the solid black image, "O" indicates that streaks disappeared with 10 sheets, and "x" indicates that streaks were sharp and did not disappear with 10 sheets.

(Evaluation of Image Quality)

Each development roller was cured under an HH environment (32.5° C.×85% RH) for 4 hours and then incorporated into a commercially available color laser printer ("HL-L9319CDW" commercially available from Brother Industries, Ltd.), 10,000 solid white images were continuously printed and solid black images were then printed, and the image quality was evaluated according to durability print evaluation. Good "O" indicates that no blur or wobble was observed in a solid black image, "⊚" indicates that very good image quality was obtained, and poor "x" indicates that blur or wobble was observed in a solid black image.

TABLE 1

| Composition for forming surface layer | Example | | | | | | | | | | | | | Comparative Example | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 |
| (a) NBR <1> AN amount 33.0 | 100 | — | — | 100 | 100 | 100 | 100 | 100 | 100 | 100 | 100 | 100 | 100 | — | — | 100 | 100 | 100 |
| NBR <2> AN amount 31.0 | — | 100 | — | — | — | — | — | — | — | — | — | — | — | — | — | — | — | — |
| NBR <3> AN amount 35.0 | — | — | 100 | — | — | — | — | — | — | — | — | — | — | — | — | — | — | — |

TABLE 1-continued

| Composition for forming surface layer | | Example | | | | | | | | | | | | | Comparative Example | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 | 3 | 4 | 5 |
| | NBR <4> AN amount 29.0 | — | — | — | — | — | — | — | — | — | — | — | — | — | 100 | — | — | — | — |
| | NBR <5> AN amount 40.0 | — | — | — | — | — | — | — | — | — | — | — | — | — | — | 100 | — | — | — |
| | Crosslinking agent | 20 | 20 | 20 | 20 | 20 | 20 | 20 | 20 | 20 | 20 | 20 | 20 | 20 | 20 | 20 | 20 | 20 | 20 |
| (b) | Ion-conducting agent <1> | 30 | 30 | 30 | 30 | 30 | 10 | 15 | 45 | 50 | — | — | 3.0 | 60 | 30 | 30 | 30 | 1.0 | 70 |
| | Ion-conducting agent <2> | — | — | — | — | — | — | — | — | — | 30 | — | — | — | — | — | — | — | — |
| | Ion-conducting agent <3> | — | — | — | — | — | — | — | — | — | — | 30 | — | — | — | — | — | — | — |
| (c) | Acrylic polymer <1> F, Si | 5.0 | 5.0 | 5.0 | — | — | 5.0 | 5.0 | 5.0 | 5.0 | 5.0 | 5.0 | 5.0 | 5.0 | 5.0 | 5.0 | — | 5.0 | 5.0 |
| | Acrylic polymer <2> F | — | — | — | 5.0 | — | — | — | — | — | — | — | — | — | — | — | — | — | — |
| | Acrylic polymer <3> Si | — | — | — | — | 5.0 | — | — | — | — | — | — | — | — | — | — | — | — | — |
| Evaluation | Bleeding resistance | ◎ | ◎ | ◎ | ◎ | ◎ | ◎ | ◎ | ◎ | ○ | ◎ | ◎ | ◎ | ○ | x | x | x | ◎ | x |
| | Image quality | ◎ | ◎ | ◎ | ◎ | ◎ | ○ | ○ | ◎ | ◎ | ◎ | ◎ | ○ | ◎ | ○ | ◎ | x | x | ○ |

In each example, the surface layer of the development roller contained a binder made of an acrylonitrile-butadiene rubber having an acrylonitrile amount of 31 mass % or more and 36 mass % or less, an ion-conducting agent, and an acrylic polymer having at least one selected from among a silicone group and a fluorine-containing group, and the content of the ion-conducting agent was 3.0 parts by mass or more and 60 parts by mass or less with respect to 100 parts by mass of the binder. On the other hand, in Comparative Example 1, the acrylonitrile amount of NBR in the binder was 29.0 mass %. In Comparative Example 2, the acrylonitrile amount of NBR in the binder was 40.0 mass %. In Comparative Example 3, the surface layer did not contain an acrylic polymer having at least one selected from among a silicone group and a fluorine-containing group. In Comparative Example 4, the content of the ion-conducting agent was 1.0 part by mass with respect to 100 parts by mass of the binder. In Comparative Example 5, the content of the ion-conducting agent was 70 parts by mass with respect to 100 parts by mass of the binder. In Comparative Examples 1 and 2, since the acrylonitrile amount of NBR of the binder was outside of an appropriate range, the bleeding resistance was inferior. In Comparative Example 3, since no acrylic polymer having at least one selected from among a silicone group and a fluorine-containing group was contained, the bleeding resistance was inferior. In Comparative Example 4, since the amount of the ion-conducting agent was small, the resistance was not lowered and the image quality was inferior. In Comparative Example 5, since the amount of the ion-conducting agent was large, the bleeding resistance was inferior. It can be understood that, based on such examples and comparative examples, according to the present disclosure, both low resistance and minimizing bleed-out of the ion-conducting agent can be achieved.

Then, comparing between the examples, it can be understood that, when the content of the ion-conducting agent in the surface layer was in a range of 3.0 to 30 parts by mass, the bleeding resistance was particularly excellent. In addition, it can be understood that, when the content of the ion-conducting agent in the surface layer was in a range of 30 to 60 parts by mass, an effect of minimizing image quality degradation due to low resistance was excellent.

While embodiments and examples of the present disclosure have been described above, the present disclosure is not limited to the embodiments and examples, and various modifications can be made without departing from the spirit and scope of the present disclosure.

The invention claimed is:

1. A development roller for an electrophotographic device, comprising
   a shaft body, an elastic body layer formed on an outer periphery of the shaft body, and a surface layer formed on the outer periphery of the elastic body layer,
   wherein the surface layer contains following (a) to (c),
   (a) a binder made of an acrylonitrile-butadiene rubber having an acrylonitrile amount of 32 mass % or more and 35 mass % or less, and the (a) is a crosslinked body;
   (b) an ion-conducting agent; and
   (c) an acrylic polymer having both a silicone group and a fluorine-containing group, and
   a content of the (b) is 3.0 parts by mass or more and 40 parts by mass or less with respect to 100 parts by mass of (a),
   the (c) is an acrylic block copolymer composed of a polymer segment having at least one selected from among a silicone group and a fluorine-containing group and a polymer segment having no silicone group and fluorine-containing group.

* * * * *